(12) United States Patent
Hall et al.

(10) Patent No.: US 6,462,204 B2
(45) Date of Patent: Oct. 8, 2002

(54) POLYCYCLIC DYES

(75) Inventors: Nigel Hall, Bury (GB); Ronald Winsford Kenyon, Bridport (GB)

(73) Assignee: DyStar Textilfarben GmbH & Co. Deutschland KG (DE)

( * ) Notice: Subject to any disclaimer, the term of this patent is extended or adjusted under 35 U.S.C. 154(b) by 0 days.

(21) Appl. No.: 09/963,022

(22) Filed: Sep. 25, 2001

(65) Prior Publication Data

US 2002/0077490 A1 Jun. 20, 2002

(30) Foreign Application Priority Data

Oct. 5, 2000 (GB) .............................. 0024440

(51) Int. Cl.$^7$ .......................... C07D 407/00
(52) U.S. Cl. ............................ 549/299; 8/578
(58) Field of Search ................ 549/299; 8/578

(56) References Cited

U.S. PATENT DOCUMENTS 4,650,882 A  3/1987  Kenyon et al. ............. 549/299

FOREIGN PATENT DOCUMENTS

| EP | 333 337 | 9/1989 |
| EP | 371 223 | 6/1990 |
| EP | 469 723 | 2/1992 |
| EP | 492 893 | 7/1992 |
| EP | 559 345 | 9/1993 |
| EP | 598 303 | 5/1994 |
| EP | 640 667 | 3/1995 |
| JP | 7011587 | 1/1995 |
| JP | 11158403 | 6/1999 |

OTHER PUBLICATIONS

McCelland, RD et al 'Manufacture of colored condensation polymers' CA 113:80691 (1990).*

* cited by examiner

*Primary Examiner*—Amelia Owens
(74) *Attorney, Agent, or Firm*—Connolly Bove Lodge & Hutz LLP

(57) ABSTRACT

The present invention refers to a polycyclic dye of the formula (I)

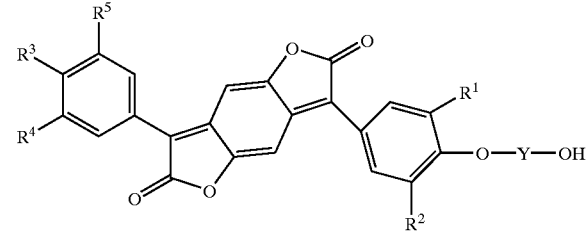

wherein each of $R^1$, $R^2$, $R^4$ and $R^5$, independently, is hydrogen, alkyl or alkoxy;

$R^3$ is hydrogen, alkyl, optionally substituted alkoxy or amino; and

Y is a straight or branched chain $C_{1-8}$ alkylene group, methods for its preparation and a method for coloring synthetic fibre material or fibre blend thereof using such polycyclic dye.

20 Claims, No Drawings

POLYCYCLIC DYES

This invention relates to polycyclic dyes, especially 3,7-diphenyl benzodifuranone dyes.

EP-A-0363034 discloses the preparation of 3,7-diphenyl benzodifuranone dyes and EP-A-0469723 discloses the use of such dyes in thermal transfer printing. The dyes disclosed in EP-A-0363034 have the general formula.

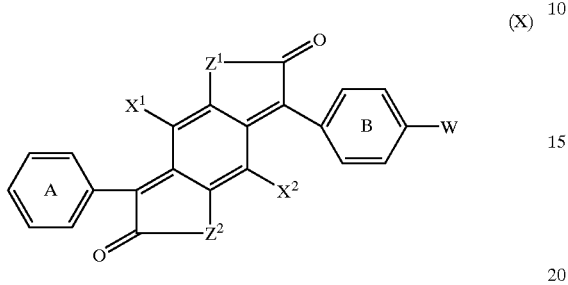

(X)

wherein

W is —NR$^1$R$^2$ or —OR$^3$

R$^3$ is H or an optionally substituted alkyl, alkenyl, cycloalkyl or aralkyl group;

each of R$^1$ and R$^2$ independently is H, or an optionally substituted alkyl, alkenyl, cycloalkyl, aralkyl or aryl group; or R$^1$ and R$^2$ together with the nitrogen atom to which they are attached form a heterocyclic ring; or R$^1$ or R$^2$ together with the nitrogen atom and the adjacent carbon atom of Ring B form a heterocyclic ring;

Ring A is unsaturated or is substituted by from one to three groups

Ring B is unsubstituted, apart from the group W, or is substituted by one or two further groups;

each of Z$^1$ and Z$^2$ independently is —O—, —S— or —NY— in which Y is H, an optionally-substituted hydrocarbon group or an acyl group; and each of X$^1$ and X$^2$, independently, is hydrogen, halogen, cyano, alkyl, aryl, carbamoyl, sulphamoyl, COOH and carboxylic acid esters.

One of the many groups additional to the group W which may be substituted on the Ring B is a hydroxyalkyloxy group.

EP-A-0492893 discloses a mixture of dyes each of the formula

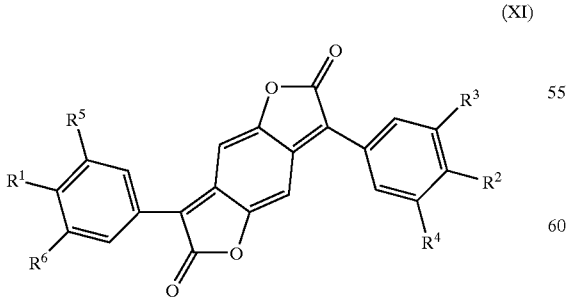

(XI)

wherein each of R$^1$ and R$^2$ independently is hydrogen, nitro, halogen, C$_{1-6}$-alkyl, C$_{1-6}$-alkoxy, phenyl, phenoxy, C$_{1-6}$-alkoxyphenyl, cyano, —COOR and —SR, hydroxy, OCO.C$_{1-6}$-alkyl, —SO$_2$OH, —SO$_2$Cl, —SO$_2$C$_{1-6}$-alkyl, —NR$_2$ and —CONR$_2$, —OC$_{1-6}$-alkyl-COOR$^5$, —OC$_{1-6}$-alkylOR$^5$, —OC$_{1-6}$-alkylOR$^5$OR$^5$, and —OC$_{1-6}$-alkylOCOR$^5$, —OC$_{2-6}$-alkenyl, —OC$_{1-6}$alkyl-Z, —OC$_{1-6}$-alkylOC$_{1-6}$alkyl-Z and —OC$_{1-6}$-alkylSC$_{1-6}$-alkyl-Z in which Z is a 5-, 6- or 7-membered saturated or unsaturated heterocyclic residue; and each of R$^3$, R$^4$, R$^5$ and R$^6$, independently, is hydrogen, C$_{1-6}$-alkyl, halogen and C$_{1-6}$-alkoxy, in which each R independently is —H, C$_{1-6}$-alkyl or phenyl and in which each R$^5$ independently is H, C$_{1-6}$-alkyl, —C$_{1-6}$-alkyl-C$_{1-6}$-alkoxy or phenyl except where the mixture contains one compound of Formula (XI) in which R$^2$ is —OC$_2$H$_5$ and R$^1$, R$^3$, R$^4$, R$^5$ and R$^6$ are all absent, one compound of Formula (XI) in which R$^2$ is n-propoxy and R$^1$, R$^3$, R$^4$, R$^5$ and R$^6$ are all absent and 4-[1-cyano-methyl-4,5-dicyano imidaz-2-ylazo] N-ethyl-N-(ethoxycarbonyl-propyl)amino-benzene.

EP-A-0371223 discloses a range of 3,7-diphenyl benzodifuranone dyes of the formula

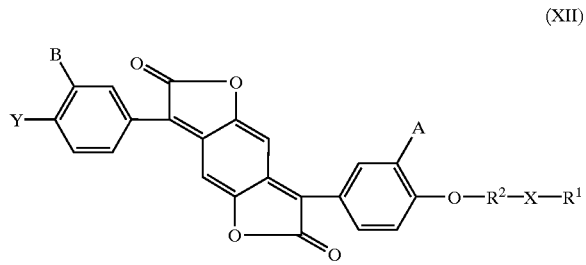

(XII)

wherein each of A and B, independently, is hydrogen, a C$_1$–C$_4$ alkyl group or a C$_1$–C$_4$ alkoxy group;

Y is hydrogen, a C$_1$–C$_4$ alkyl group, a C$_1$–C$_4$ alkoxy group or a group of the formula —O—R$^2$—X—R$^1$, or Y and B are taken together with each other to form a methylenedioxy group;

R$^1$ is a C$_1$–C$_4$ alkyl group, a phenyl group or a C$_3$ or C$_4$ alkenyl group; R$^2$ is an ethylene group unsubstituted or substituted by a methyl, methoxymethyl or ethoxymethyl group, a propylene group unsubstituted or substituted by a hydroxy, C$_1$–C$_4$ alkylcarbonyloxy or methyl group, or a C$_4$–C$_8$ alkylene group unsubstituted or substituted by a hydroxy, C$_1$–C$_4$ alkylcarbonyloxy or C$_1$–C$_4$ alkoxy group; and X is a divalent group of —O—,—S—,—SO—,—SO$_2$— or —N(R$^3$)— in which R$^3$ is a hydrogen atom or a C$_1$–C$_4$ alkyl group;

with the proviso that when X is a divalent group of —O— or —S— and Y and B are not taken together with each other to form a methylenedioxy group, and when R$^2$ is an unsubstituted ethylene or unsubstituted propylene group, R$^1$ is a C$_3$ or C$_4$ alkyl or alkenyl group, or a C$_1$–C$_4$ alkyl group, respectively. In such dyes, the group —O—R$^2$—X—R$^1$ may be an alkoxyalkoxy group.

Surprisingly, we find that 3,7-diphenyl benzodifuranone dyes having a hydroxyalkoxy group at the 4-position of at least one of the 3- and 7-phenyl groups show improved levelling properties as compared with the corresponding dyes containing a 4-alkoxy groups and improved build up as compared with the corresponding dyes containing a 4-hydroxy group.

Thus, the present invention provides a polycyclic dye of the formula (I)

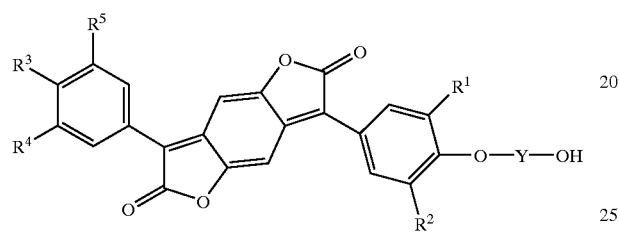

(I)

wherein each of $R^1$, $R^2$, $R^4$ and $R^5$, independently, is hydrogen, alkyl or alkoxy;

$R^3$ is hydrogen, alkyl, optionally substituted alkoxy or amino; and

Y is a straight or branched $C_{1-8}$ alkylene group.

The alkyl group or the alkyl moiety of the alkoxy group of each of $R^1$–$R^5$ is preferably a $C_{1-6}$ alkyl, more preferably a $C_{1-4}$ alkyl group or moiety. A $C_{1-4}$ alkyl group or moiety can be straight-chained or branched and be for example methyl, ethyl, n-propyl, i-propyl, n-butyl, i-butyl, sec.butyl or tert.-butyl.

Preferably, ih the formula (I), each of $R^2$, $R^4$ and $R^5$ is hydrogen;

$R^1$ is hydrogen, methyl or ethyl;

$R^3$ is hydrogen, alkyl or alkoxy; and

Y is a straight or branched $C_{2-5}$ alkylene group.

Especially preferred 3,7-diphenyl benzodifuranone dyes have the respective formulae (Ia), (Ib) and (Ic)

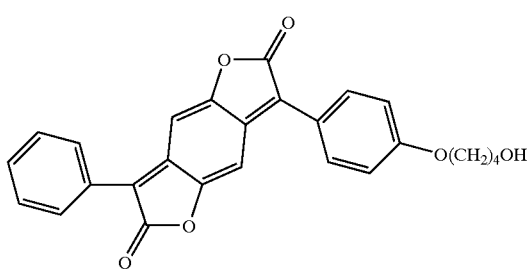

(Ia)

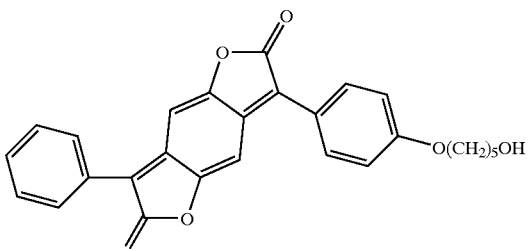

(Ib)

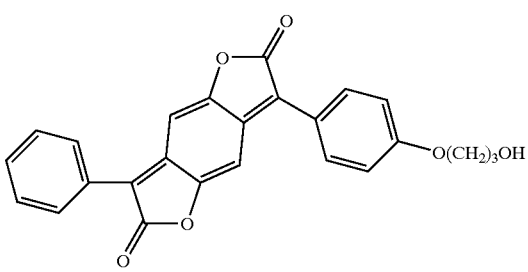

(Ic)

In another preferred range of dyes within the formula (I), $R^3$ is a substituted alkoxy group (a) of the formula —$OR^6CO_2R^7OR^8$, wherein each of $R^6$, $R^7$ and $R^8$ independently is a straight or branched $C_{1-6}$ alkylene group; or (b) of the formula —$OR^9OH$, wherein $R^9$ is a straight or branched $C_{1-8}$ alkylene group; or (c) wherein the substituent is a tetrahydrofurfuryl or tetrahydropyran-2-ylmethyl group, an especially preferred substituted alkoxy group being the fur-2-ylmethoxy group.

A 3,7-diphenyl benzodifuranone dye of the formula (I), defined above, may be prepared, in accordance with a process aspect of the invention, by a process which comprises reacting a compound of the formula

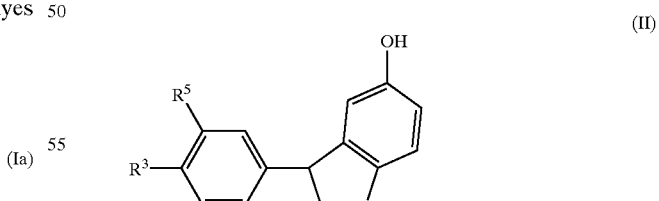

(II)

wherein each of $R^3$, $R^4$ and $R^5$ is as defined above, with a mandelic acid derivative of the formula

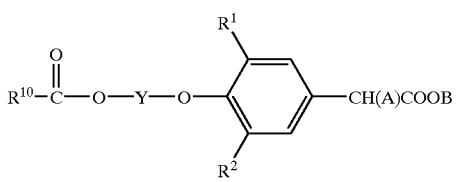

(III)

wherein

A is hydroxyl, ($C_{1-4}$ alkyl) carbonyloxy or halogen;

B is hydrogen, $C_{1-4}$ alkyl or aryl;

$R^{10}$ is a $C_{1-4}$ alkyl or phenyl group; and each of $R^1$, $R^2$ and Y is as defined above to form a 2,6-dioxo-2,3,6,7-tetrahydro benzodifuranone derivative (IV) oxidising the derivative (IV) to obtain the corresponding 2,6-dioxo-2,3-dihydrobenzodifuranone derivative (V) and deacylating the derivative (V) to provide the polycyclic dye of the formula (I).

Halogen is preferably fluorine, chlorine or bromine. Aryl is preferably phenyl or substituted phenyl.

Especially preferably, in the formula (III), A is hydroxyl, B is hydrogen and $R^{10}$ is methyl.

The reaction of the compound of the formula (II) with the mandelic acid derivative of the formula (III) is preferably carried out in the presence of an acid catalyst, e.g. sulphuric acid, p-toluene sulphonic acid or dodecylbenzene sulphonic acid, and preferably at a temperature of from 50 to 70° C. and preferably for a period of from 3 to 5 hours.

The oxidation reaction is preferably carried out at a temperature of from 40 to 60° C. and preferably from a period of from 15 to 45 minutes. Especially preferred oxidising agents are chloranil, hydrogen peroxide and ammonium persulphate.

The deacylation treatment is preferably carried out at a temperature of from 80 to 100° C. and preferably for a period of from 2 hour to 2 hours, and more preferably in a polar solvent such as 2-ethoxyethanol or dimethyl formamide. An especially preferred deacylating agent is hydrochloric or sulphuric acid.

An alternative process for preparing a polycyclic dye of the formula (I), given and defined above, comprises reacting a compound of the formula (VI)

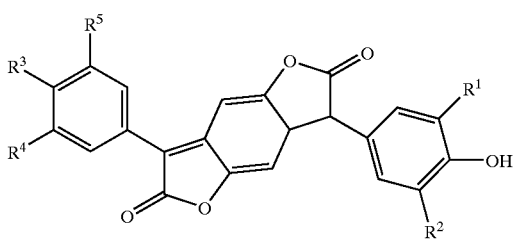

wherein each of $R^1$, $R^2$, $R^3$, $R^4$ and $R^5$ is as defined above; with an alkylating agent of the formula

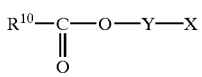

(VII)

wherein

Y is as defined in above;

$R^{10}$ is a $C_{1-4}$ alkyl or phenyl group; and

X is a halogen atom;

to obtain an acyl-2,6-dioxo-2,3,6,7-tetrahydrobenzodifuran derivative of the formula (VIII)

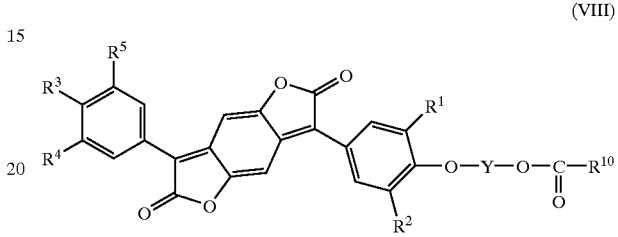

wherein each of $R^1$, $R^2$, $R^3$, $R^4$, $R^5$, $R^{10}$ and Y is as defined above; and deacylating the derivative (VIII) to provide the polycyclic dye of the formula (I).

Preferably, in the formula (VII), X is bromine and $R^{10}$ is methyl.

Typically, the alkylating agent may be 2-bromoethyl acetate, 4-bromobutyl acetate or 5-bromopentyl acetate.

The alkylation reaction is preferably carried out in the presence of a solvent, for example, toluene, sulpholane or dimethyl formamide, and more preferably under reflux for, say, 2–5 hours.

The alkylation reaction is also preferably carried out in the presence of a base, for example, calcium or potassium carbonate or dicylohexylamine.

The deacylation of the compound (VIII) may be carried out in a manner analogous to that described above for deacylation of compound (V) and is again preferably carried out at a temperature of from 80 to 100° C. and preferably for a period of from 2 hour to 2 hours, and more preferably is a polar solvent such as 2-ethoxyethanol or dimethyl formamide. An especially preferred deacylating agent is hydrochloric or sulphuric acid.

In yet another alternative, but less preferred process, the hydroxyphenyl compound of the formula (VI) may be reacted directly with a haloalkanol of the formula

X—Y—OH wherein each of X and Y is as defined above, for example, 2-bromo-ethanol, 4-bromobutanol, 5-bromopentanol, 3-chloropropanol or 6-chlorohexanol, to obtain the compound of the formula (I).

The hydroxyphenyl compound of the formula (VI) may be prepared by a known method such as that described in EP-A-0033583 (see Example 26).

According to a further feature of the present invention, there is provided a process for colouring a fibre material on blend thereof, especially a synthetic textile material or fibre blend thereof, which comprises applying thereto a polycyclic dye as hereinbefore defined.

The synthetic textile material may be selected from secondary cellulose acetate, cellulose triacetate, polyamide, polyacrylonitrile and aromatic polyester. The synthetic textile material is preferably polyamide such as polyhexamethylene adipamide or aromatic polyester, especially polyethylene terephthalate. Fibre blends may comprise mixtures of different synthetic textile materials or mixtures of synthetic and natural textile materials. Preferred fibre blends include those of polyester cellulose, such as polyester-cotton, and polyester-elastane ("elastane" is a polyurethane/polyether block copolymer, commercially available as "Lycra"). The textile materials or blends thereof may be in the form of filaments, loose fibres, yarn or knitted fabrics.

The dyes according to the invention, optionally in conjunction with other disperse dyes, may be applied to the synthetic textile materials or fibre blends thereof by processes which are conventionally employed in applying disperse dyes to such materials and fibre blends.

Suitable process conditions include the following:

i) exhaust dyeing at a pH of from 4 to 6.5, at a temperature of from 125° C. to 140° C. for from 10 to 120 minutes under pressure of from 1 to 2 bar, a sequestrant optionally being added;

ii) continuous dyeing at a pH of from 4 to 6.5, at a temperature of from 190° C. to 225° C. for from 15 seconds to 5 minutes, a migration inhibitor optionally being added;

iii) printing direct at a pH of from 4 to 6.5, at a temperature of from 160° C. to 185° C. for from 4 to 15 minutes for high temperature steaming, or at a temperature of from 190° C. to 225° C. for from 15 seconds to 5 minutes for bake fixation with dry heat or at a temperature of from 120° C. to 140° C. and 1 to 2 bar for 10 to 45 minutes for pressure steaming, wetting agents and thickeners (such as alginates) of from 5 to 100% by weight of the dye optionally being added;

iv) discharge printing (by padding the dye on to the textile material, drying and overprinting) at a pH of from 4 to 6.5, migration inhibitors and thickeners optionally being added;

v) carrier dyeing at a pH of from 4 to 6.5, at a temperature of from 95° C. to 100° C. using a carrier such as methylnaphthalene, diphenylamine or 2-phenylphenol, sequestrants optionally being added.

In all the above processes, the dyes according to the invention is applied as a dispersion comprising from 0.01% to 4% by weight of the dye mixture in aqueous medium.

Compositions comprising dispersions of the disperse dye of the invention or an aqueous medium form a further feature of the present invention. The compositions may comprise from 1% to 35%, typically from 5% to 30%, by weight of a mixture of the dyes in an aqueous medium. The compositions are preferably buffered at pH 2 to 7, more preferably at pH 4 to 6.

The dye dispersions may further comprise ingredients conventionally used in colouration applications such as dispersing agents, for example lignosulphonates, naphthalene sulphonic acid/formaldehyde condensates or phenol/cresol/sulphanilic acid/formaldehyde condensates, surfactants, wetting agents such as alkyl aryl ethoxylates which may be sulphanated or phosphated, inorganic salts, de-foamers such as mineral oil or nonanol, organic liquids and buffers. Dispersing agents may be present at from 10% to 200% on the weight of the dye. Wetting agents may be used at from 0% to 20% on the weight of the dye. The dispersions may be prepared by bead milling the dye with glass beads or sand in an aqueous medium or by combining dispersions of milled dyes.

Dispersions may be dried, after the addition of any extra dispersing agents, to give a solid physical form with from 5 to 60% by weight of total colour.

In addition to the above-mentioned application processes, the dyes of the invention may be applied to synthetic textile materials and fibre blends by ink-jet printing, the substrates optionally having been pre-treated to aid printing. For ink-jet applications, the application medium may comprise water and a water-soluble organic solvent, preferably in a weight ratio of 1:99 to 99:1, more preferably 1:95 to 50:50 and especially in the range 10:90 to 40:60. The water-soluble organic solvent preferably comprises a $C_1$–$C_4$-alkanol, especially methanol or ethanol, a ketone, especially acetone, methyl ethyl ketone, 2-pyrrolidone or N-methylpyrrolidone, a glycol, especially ethylene glycol, propylene glycol, trimethylene glycol, butane-2,3-diol, thiodiglycol or diethylene glycol, a glycol ether or diethylene glycol monomethyl ether, urea, a sulphone, especially bis-(2-hydroxyethyl) sulphone or mixtures thereof.

The dye may also be applied to textile materials using supercritical fluid solvents, for example supercritical carbon dioxide, in which case the dye formulating agents may optionally be omitted.

Preferred embodiments of the invention will now be described in more detail with reference to the following Examples in which all percentages are by weight; unless otherwise stated.

EXAMPLE 1

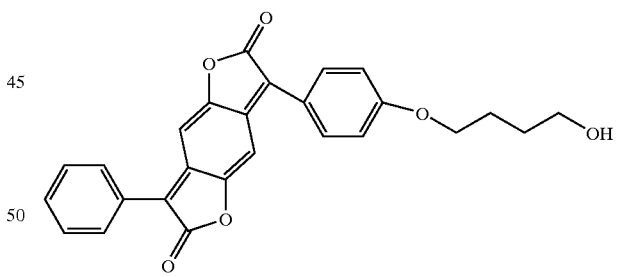

(Ia)

A mixture of 5-hydroxy-2-oxo-3-phenyl-2,3-dihydrobenzofuran. (4.5 parts), 4-(4-acetoxybutoxy) mandelic acid (6.0 parts) and a mixture of acetic acid and sulphuric acid (40 parts; 95:5 vol/vol) was heated at 60° C. for 4 hrs. Chloranil (4.6 parts) was added and the mixture was stirred at 40° C. for 30 mins. The reaction mixture was diluted with methanol (50 parts), stirred at ambient for 30 mins and the product was isolated by filtration to yield; 3-phenyl-7-(4-(4-acetoxybutoxy)phenyl) -2,6-dioxo-2,6-dihydrobenzo[1:2-b, 4:5-b']difuran (5.5 parts).

The product (5.5 parts) was stirred with a mixture of 2-ethoxyethanol (50 parts) and HCl (10 parts; 34% soln) at 90° C. for 1 hr; methanol (100 parts) was then added at 40° C. and the product was isolated by filtration; to yield 3-phenyl-7-(4-(4-hydroxybutoxy)phenyl) -2,6-dioxo-2,6-dihydrobenzo [1:2-b, 4:5-b']difuran (2.8 parts). max=501 nm (dichloromethane)

When applied to polyester from an aqueous dispersion, the product gave bright mid red shades with excellent build up and level dyeing properties.

EXAMPLE 2

(Ib)

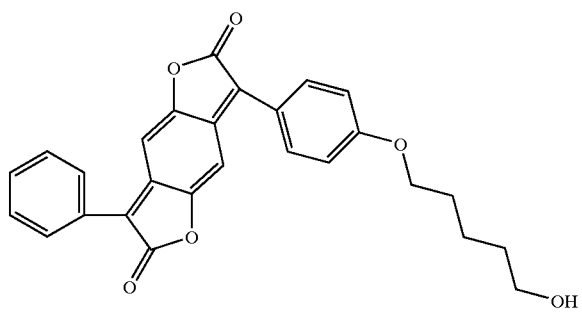

A mixture of 3-phenyl-7-(4-hydroxyphenyl)-2,6-dihydrobenzo[1:2-b,4:5-b']difuran (10.7 parts), 5-bromopentylacetate (7.4 parts), potassium carbonate (4.5 parts) and diemthylformamide (200 parts) was stirred under reflux for 3 hrs. An additional portion of 5-bromopentylacetate (1.7 parts) was added and the mixture was stirred a further 2 hrs under reflux. The mixture was cooled, the product was isolated by filtration and washed with cold water (60 parts) to yield a damp paste (9.8 parts).

The paste was set stirring with a mixture of 2-ethoxyethanol (100 parts) and 34% hydrochloric acid (25 parts) and the mixture was heated at 130° C. for 3 hrs. The product was filtered hot, washed with cold water (90 parts) and dried to yield 3-phenyl-7-(4-(5-hydroxypentoxy) phenyl)-2,6-dioxo-2,6-dihydrobenzo[1:2-b, 4:5-b']difuran (3.5 parts). max=503 nm (dichloromethane).

When applied to polyester from an aqueous dispersion, the product gave bright mid red shades with excellent build up and level dyeing properties.

EXAMPLES 3–10

The following dyes of the formula

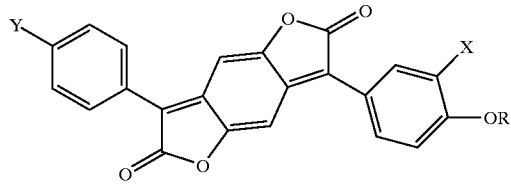

were prepared by the procedure described in Example 2

| Example | R | X | Y |
|---|---|---|---|
| 3 | —C$_2$H$_4$OH | —H | —H |
| 4 | —C$_3$H$_6$OH | —H | —H |
| 5 | —C$_6$H$_{12}$OH | —H | —H |
| 6 | —C$_2$H$_4$OH | —CH$_3$ | —H |
| 7 | —C$_4$H$_8$OH | —CH$_3$ | —H |
| 8 | —C$_5$H$_{10}$OH | —CH$_3$ | —H |
| 9 | —C$_6$H$_{12}$OH | —CH$_3$ | —H |
| 10 | —C$_4$H$_8$OH | —H | —OC$_3$H$_7$ |

What is claimed is:

1. A polycyclic dye of the formula (1)

(I)

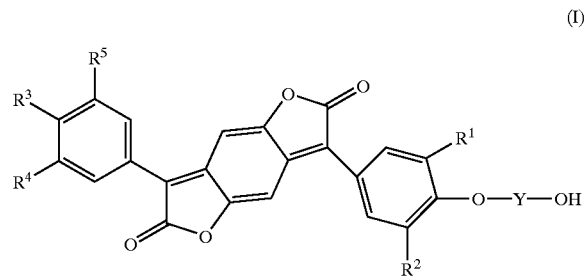

wherein each of $R^1$, $R^2$, $R^4$ and $R^5$, independently, is hydrogen, alkyl or alkoxy; $R^3$ is hydrogen, alkyl optionally substituted alkoxy or amino; and Y is a straight or branched chain C$_{3-8}$ alkylene group.

2. A polycyclic dye according to claim 1, wherein, in the formula (I), each of $R^2$, $R^4$ and $R^5$ is hydrogen;

$R^1$ is hydrogen, methyl or ethyl;

$R^3$ is hydrogen, alkyl or alkoxy; and

Y is a straight or branched C$_{3-5}$ alkylene group.

3. A polycyclic dye of the formula (Ia)

(Ia)

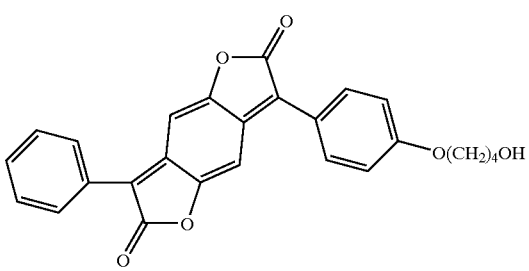

4. A polycyclic dye of the formula (Ib)

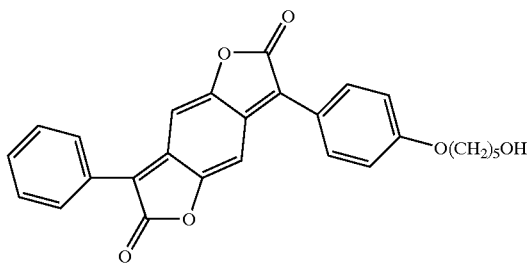

(Ib)

5. A process for preparing a polycyclic dye of the formula (I)

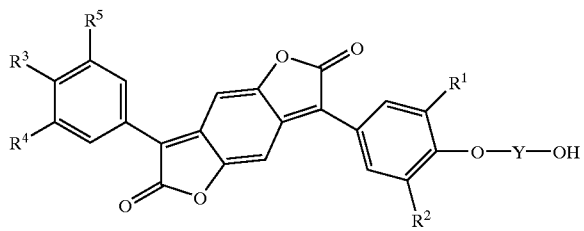

(I)

wherein
  each of $R^1$, $R^2$, $R^4$ and $R^5$, independently, is hydrogen, alkyl or alkoxy;
  $R^3$ is hydrogen, alkyl, optionally substituted alkoxy or amino; and
  Y is a straight or branched chain $C_{1-8}$ alkylene group;
  which process comprises reacting a compound of the formula (III)

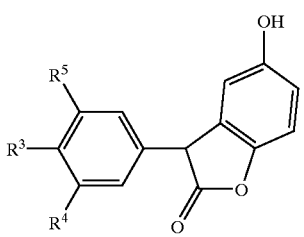

(II)

wherein
  each of $R^3$, $R^4$ and $R^5$ is as defined above, with a mandelic acid derivative of the formula

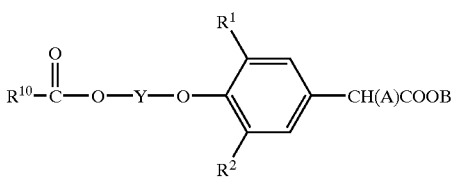

(III)

wherein
  A is hydroxyl, ($C_{1-4}$ alkyl) carboxyloxy or halogen;
  B is hydrogen, $C_{1-4}$ alkyl or aryl;
  $R^{10}$ is a $C_{1-4}$ alkyl or phenyl group; and each of $R^1$, $R^2$ and Y is as defined above,
  to form a 2,6-dioxo-2,3,6,7-tetrahydrobenzodifuran derivative (IV), oxidising the derivative (IV) to obtain the corresponding 2,6-dioxo-2,3-dihydrobenzodifuran derivative (V) and deacylating the derivative (V) to provide the polycylic dye of the formula (I).

6. A process according to claim 5, wherein, in the formula (III), A is hydroxyl, B is hydrogen and $R^{10}$ is methyl.

7. The process according to claim 5, wherein the oxidizing agent is chloroanil, hydrogen peroxide or ammonium persulphate.

8. The process according to claim 6, wherein the oxidation is carried out in the presence of an acid catalyst.

9. The process as claimed in claim 8, wherein the acid catalyst is sulphuric acid, p-toluene sulphonic acid or dodecylbenzene sulphonic acid.

10. The process according to claim 5, wherein the deacylating is carried out by treatment with hydrochloric or sulphuric acid.

11. A process for preparing a polycyclic dye of the formula (I)

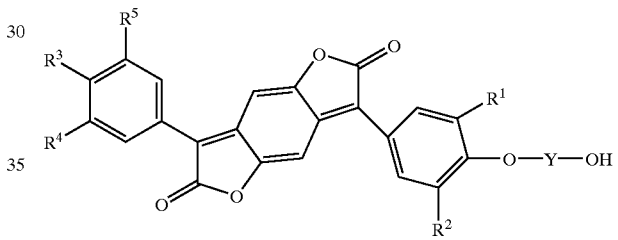

(I)

wherein
  each of $R^1$, $R^2$, $R^4$ and $R^5$, independently, is hydrogen, alkyl or alkoxy;
  $R^3$ is hydrogen, alkyl, optionally substituted alkoxy or amino; and
  Y is a straight or branched chain $C_{1-8}$ alkylene group;
  which process comprises reacting a compound of the formula (VI)

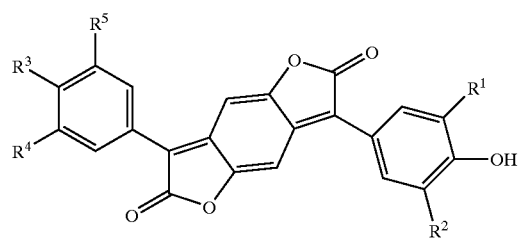

(VI)

wherein
  each of $R^1$, $R^2$, $R^3$, $R^4$ and $R^5$ is as defined above; with an alkylating agent of the formula (VIII)

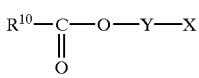

(VII)

wherein
Y is as defined above,
$R^{10}$ is a $C_{1-4}$ alkyl or phenyl group; and
X is a halogen atom;
to obtain an acyl-2,6-diazo-2,3,6,7-tetrahydrobenzodifuran derivative of the formula (VIII)

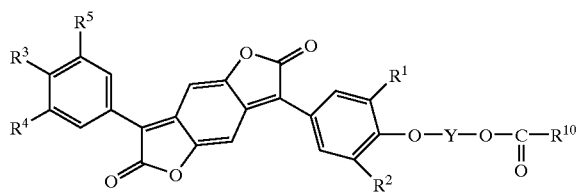

(VIII)

wherein
each of $R^1$, $R^2$, $R^3$, $R^4$, $R^5$, $R^{10}$ and Y are as defined above and deacylating the derivative (VIII) to provide the polycyclic dye of the formula (I).

12. The process according to claim 11, wherein, in formula (VII), X is bromine and $R^{10}$ is methyl.

13. The process according to claim 12, wherein the alkylation reaction is carried out in the presence of a solvent.

14. The process according to claim 13, wherein the solvent is toluene, sulpholane or dimethyl formamide.

15. The process according to claim 14, wherein the alkylation reaction is carried out in the presence of a base.

16. The process according to claim 15, wherein the base is calcium carbonate, potassium carbonate or dicyclohexylamine.

17. The process according to claim 16, wherein the deacylation is carried out by treatment with hydrochloric acid or sulphuric acid.

18. A process for coloring a synthetic fiber material or fiber blend thereof which process comprises applying thereto the material polycyclic dye according to claim 1.

19. A composition comprising a dye mixture which comprises the polycyclic dye according to claim 1 and dispersed in an aqueous medium.

20. The polycyclic dye according to claim 1, wherein $R^3$ is a substituted alkoxy group
(a) of the formula —$OR^6CO_2R^7OR^8$, wherein each of $R^6$, $R^7$ and $R^8$ independently is a straight or branched $C_{1-6}$ alkylene group; or
(b) of the formula —$OR^9OH$, wherein $R^9$ is a straight or branched $C_{1-8}$ alkylene group; or
(c) wherein the substituent is a tetrahydrofurfuryl or tetrahydropyran-2-ylmethyl group.

* * * * *

UNITED STATES PATENT AND TRADEMARK OFFICE
CERTIFICATE OF CORRECTION

PATENT NO.      : 6,462,204 B2
DATED           : October 8, 2002
INVENTOR(S)     : Hall et al.

It is certified that error appears in the above-identified patent and that said Letters Patent is hereby corrected as shown below:

<u>Title page,</u>
Item [75], Inventors, please change "Winsford" to -- Wynford --.

<u>Column 11,</u>
Line 39, delete "(III)" and insert -- (II) --.

Signed and Sealed this

Fourth Day of February, 2003

JAMES E. ROGAN
*Director of the United States Patent and Trademark Office*